(12) United States Patent
Schechter

(10) Patent No.: US 7,954,478 B1
(45) Date of Patent: Jun. 7, 2011

(54) AIRLESS ENGINE

(76) Inventor: Michael Moses Schechter, Farmington Hills, MI (US)

( * ) Notice: Subject to any disclaimer, the term of this patent is extended or adjusted under 35 U.S.C. 154(b) by 0 days.

(21) Appl. No.: 12/460,881

(22) Filed: Jul. 27, 2009

(51) Int. Cl.
*F02M 25/07* (2006.01)
(52) U.S. Cl. .................................. 123/567; 123/568.12
(58) Field of Classification Search .................. 123/567, 123/585–588, 568.11, 568.12
See application file for complete search history.

(56) References Cited

U.S. PATENT DOCUMENTS

| | | | | |
|---|---|---|---|---|
| 3,608,529 | A | * | 9/1971 | Smith et al. ................. 123/25 C |
| 3,618,576 | A | * | 11/1971 | Dixon ............................... 60/279 |
| 3,672,341 | A | * | 6/1972 | Smith et al. ................. 123/25 C |
| 3,696,795 | A | * | 10/1972 | Smith et al. ................. 123/25 C |
| 3,861,367 | A | * | 1/1975 | Kelmar .......................... 123/567 |
| 3,983,882 | A | * | 10/1976 | Billings ....................... 123/25 A |
| 4,064,840 | A | * | 12/1977 | Vierling .................... 123/568.12 |
| 5,400,746 | A | * | 3/1995 | Susa et al. .................... 123/25 E |
| 5,649,517 | A | | 7/1997 | Poola et al. |
| 5,960,777 | A | | 10/1999 | Nemser et al. |
| 6,055,808 | A | | 5/2000 | Poola et al. |
| 6,067,973 | A | | 5/2000 | Chanda et al. |
| 6,352,068 | B1 | | 3/2002 | Jacobsen |
| 6,397,807 | B1 | | 6/2002 | Suzuki |
| 7,543,577 | B2 | * | 6/2009 | Ha et al. ........................ 123/585 |
| 2006/0037591 | A1 | * | 2/2006 | Ferguson ....................... 123/567 |
| 2007/0251235 | A1 | * | 11/2007 | Schmid et al. ........... 123/568.12 |

* cited by examiner

*Primary Examiner* — Hieu T Vo
*Assistant Examiner* — Arnold Castro

(57) ABSTRACT

An internal-combustion engine receives no air from outside atmosphere. Instead, combustion gas expelled from the engine is cooled and recycled back into the engine. That gas contains no nitrogen and consists mostly of carbon dioxide and water vapor. Oxygen and fuel are added to the recycled gas, and the resulting mixture is used to perform an internal-combustion cycle. A small amount of the expelled combustion gas is discharged into outside environment, and the rest is recycled. Since no nitrogen is present, no nitrogen oxides are produced. The amount of other harmful exhaust emissions, including particulate matter, is greatly reduced too, since most of them are recycled back into the engine. The engine is inherently supercharged with combustion-gas pressure and, since the combustion gas is heavier than air, the engine can be substantially smaller than a conventional engine of equal power. Direct injection of oxygen leads to further reduction in engine size. A smaller engine has much better fuel economy. Complete elimination of nitrogen oxide emissions and a significant reduction in particulate matter can substantially increase appeal of diesel engines based on the above concept.

9 Claims, 7 Drawing Sheets

AIRLESS ENGINE

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

The present invention relates to engines, in which gas produced in combustion is recycled back to the engine inlet. It also relates to engines, in which oxygen is added to gas flowing into the engine.

BACKGROUND OF THE INVENTION

Combustion of hydrocarbon fuels in internal-combustion engines is a major contributor to an increase in carbon dioxide content in Earth atmosphere, which according to prevailing scientific consensus contributes to global warming. It is also responsible for the ever increasing import of foreign oil, which adversely affects the national trade balance account. It is therefore imperative to achieve a substantial reduction in the amount of fuel consumed by internal-combustion engines on a national scale.

Most internal-combustion engines are used in ground transportation, and most vehicles driven on American roads use spark-ignition gasoline engines. Diesel engines offer a much better fuel economy than gasoline engines. Using a diesel instead of a gasoline engine, whenever possible, represents one of the most straightforward ways to achieve better fuel consumption and lower carbon dioxide emission. There are, however, some important reasons why usage of diesel engines is less prevalent than usage of gasoline engines. Diesel engines have some very significant deficiencies, some of which are listed below.

Diesels are prodigious producers of nitrogen oxides, which are considered to be some of the most harmful air pollutants. Controlling nitrogen oxides emission is very difficult and very expensive. Another drawback of diesels is emission of particulate matter, which is very harmful to human health. This too is difficult to control and adds significantly to the engine system cost and complexity. Diesel combustion process requires more air at peak power than a gasoline engine does. Because of that, diesel is substantially bigger and heavier than a comparable gasoline engine, unless its operation is boosted by induction of pressurized air. For this, most contemporary diesels use turbochargers, and this leads to a substantial increase in cost and complexity. These and some other drawbacks reduce the appeal of diesels to general public and prevent broader use of diesel engines in passenger vehicles despite their superior fuel economy.

In view of the above, it is clear that it is highly desirable to have a system and a method of internal-combustion engine operation that, when applied to diesel engines, eliminates the above disadvantages while retaining the fuel economy advantage. Such a system and a method are the subject of the present invention.

PRIOR ART

Recycling some of the engine exhaust gas back into the engine intake is not new. Many modern internal-combustion engines incorporate an exhaust gas recirculation (EGR) system that provides for adding a small amount of exhaust gas (10-15%, in most cases) to the engine intake air. This reduces the peak combustion temperature that contributes to formation of nitrogen oxides in the combustion chamber. EGR cannot eliminate the nitrogen oxide emission, but it can reduce it.

The method of the present invention does not involve adding exhaust gas to the intake air. The engine of the present invention inducts no air from outside atmosphere. Instead, combustion gas is recycled from the engine outlet back into the engine inlet and, when oxygen is added to it, forms a kind of "artificial air" that contains no nitrogen. That "artificial air" is used instead of atmospheric air to burn fuel in the engine. Since there is no nitrogen, no nitrogen oxides can form, regardless of the temperature. The engine of the present invention has zero nitrogen oxides emission.

Adding oxygen to the engine intake is also known. A U.S. Pat. No. 7,543,577 to Ha, et al describes a system, in which an internal-combustion engine is supplied with a mixture of oxygen and fuel. The system inducts atmospheric air and runs it through a PSA (pressure swing adsorption) system, where most of the nitrogen is removed and exhausted into outside environment. The remaining gas, which contains about 95% oxygen and 5% nitrogen, is mixed with fuel and fed into the engine combustion chamber. An option to induct atmospheric air and add it to the mixture is also provided. There is no recycling of combustion gas.

Operating an engine with a mixture of fuel and oxygen presents some technical difficulties. In a conventional internal-combustion engine, fuel is mixed with air containing 23% of oxygen (by weight), which takes part in combustion, and 77% of nitrogen and argon, which does not take part in combustion. Presence of a substantial amount of inert gas (nitrogen) is important, because it maintains the temperature in the combustion chamber within an acceptable level.

When fuel is burned in air, the chemically correct ratio of air to fuel is about 14.8:1, and the oxygen-to-fuel ratio is about 3.4:1. The peak combustion temperature may reach 2200 degrees Celsius, which is almost 4000 degrees Fahrenheit. The above patent does not specify what oxygen-to-fuel ratio is used, but using the chemically correct ratio (3.4:1) is out of the question, because the mass of gas would be almost four times less than it is in the case when air is used, but the amount of heat is still the same. As a result, the temperature (and the pressure) would be several times higher and would reach levels that are completely unacceptable from the point of view of the engine integrity and durability.

To maintain an acceptable level of temperature in the engine of the above patent, the oxygen-to-fuel ratio would have to be much higher than the chemically correct ratio (3.4:1). In fact, it would have to be close to the value of the air-to-fuel ratio in a conventional engine (14.8:1). The extra oxygen would serve as inert gas that absorbs the heat, and the exhaust gas will contain large amount of unused oxygen. The main disadvantage of this is that, to produce the needed amount of oxygen, the system of the above patent must handle more than four times greater amount of air than does a conventional engine that uses air directly for combustion.

Ha, et al must be fully aware of the above difficulties, since the above patent also includes means "for supplying external air to the engine when the oxygen is insufficient in the process of combustion". When atmospheric air is added to the oxygen flowing into the combustion chamber, the engine of the above patent turns into an engine running on oxygen-enriched air, like in some of the patents referred to below.

Ha, et al expect the engine of the above patent to produce less nitrogen oxides, because less nitrogen (about 5%) is available to react with oxygen. However, for the tiny amount of nitrogen oxides that form during combustion, even 5% provides a rich supply of nitrogen, if sufficient supply of oxygen is available. It is an open question if abundance of oxygen molecules chasing a scarcity of nitrogen molecules, as in the above patent, is better than an abundance of nitrogen molecules chasing a scarcity of oxygen molecules, as in a conventional engine. Regardless of the answer to that question, the system of the above patent does not eliminate the nitrogen oxide emission, because it does not eliminate nitrogen.

Ha, et al also expect carbon monoxide and unburned hydrocarbon emissions to be reduced due to abundance of oxygen in the engine of the above patent. Without question, carbon monoxide will be reduced. Reduction in unburned hydrocarbons is possible, but it is more questionable. Unburned hydrocarbons form in small crevices between the piston and the cylinder, where the flame cannot penetrate. If there is no flame, hydrocarbons don't burn, regardless of how much oxygen is available.

In contrast to the above patent, the system of the present invention does not have to induct a huge amount of air and exhaust a huge amount of nitrogen to produce a sufficient amount of oxygen for burning the fuel and for serving as an inert diluting gas. Nor does it have to add atmospheric air to serve as diluting gas. The engine of the present invention receives no air from outside atmosphere. Instead, combustion gas expelled from the engine is cooled and repeatedly recycled back into the engine. That gas contains no nitrogen and consists mostly of carbon dioxide and water vapor. Oxygen and fuel are added to the recycled gas, and the resulting mixture is used to perform an internal-combustion cycle. Only a small amount of the expelled combustion gas is discharged into outside environment, and the rest is recycled again. Since no nitrogen is present, no nitrogen oxides are produced. The engine of the present invention is a true zero nitrogen oxides emission engine.

In the engine of the present invention, the amount of other harmful exhaust emissions, including particulate matter, unburned hydrocarbons and carbon monoxide, is greatly reduced, but the reason for this has very little to do with the relative abundance or scarcity of oxygen in the combustion chamber. The key to reduction in those emissions is in repeatedly subjecting the same gas to the fires of combustion in the engine. Since most of the combustion gas is recycled back into the engine cylinders over-and-over again, an average particle of gas goes through the combustion process many times before it is discharged into outside environment. It is not likely that a particle of unburned hydrocarbon that formed in a small crevice, where the flame could not penetrate, would find itself in such crevice again when it visits the combustion chamber again. In such operation, whatever did not burn the first time is repeatedly returned to the combustion chamber and is burned there.

In a U.S. Pat. No. 6,397,807 to Suzuki, oxygen is added to the intake air for a different reason. The above patent addresses the difficulties with the cold start of internal combustion engine. The system of the above patent includes a separate combustion heater, in which fuel can be burned separately from the engine. Hot combustion gas, produced in the heater, flows into the engine intake system, where it is added to the intake air. This takes place at the engine starting time or before the engine starting time, when the engine does not even rotate. The temperature of the intake air is raised by the high temperature of the combustion gas from the heater, thereby speeding up the warm-up of the engine. The heater also heats up the engine cooling water.

In the engine of the above patent, addition of combustion gas from the heater to the engine intake air reduces the amount of oxygen available for combustion in the engine during the start-up. To compensate for oxygen deficiency, oxygen is added from an oxygen supply apparatus to the intake air or to the combustion gas. After the engine warms up, regular operation with atmospheric air resumes. The above patent claims only improvements in engine cold-start capability.

A number of other patents claim a reduction in nitrogen oxides emission and some other advantages by producing and feeding into the engine oxygen-enriched or nitrogen-reduced air.

Such are:
U.S. Pat. No. 6,352,068 to Jacobson.
U.S. Pat. No. 6,067,973 to Chanda, et al.
U.S. Pat. No. 6,055,808 to Poola, et al.
U.S. Pat. No. 5,960,777 to Nemser, et al.
U.S. Pat. No. 5,649,517 to Poola, et al.

None of the above patents claims complete elimination of nitrogen oxides, since none of them achieves complete elimination of nitrogen from the engine, as the present invention does.

It should be noticed that the concept of the present invention eliminates the need for turbochargers and superchargers in internal-combustion engines. They are not needed for boosted operation because the engine of the present invention is inherently self-supercharging. Elimination of those expensive means for boosting the engine power is a substantial reduction in cost. None of the engines in the above reviewed patents is capable of self-supercharging.

OBJECTS AND ADVANTAGES

One object of the present invention is to achieve a complete elimination of nitrogen oxides emissions from internal-combustion engines. This is achieved by eliminating nitrogen. Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of diesel engines, which, in their conventional incarnations, are prodigious producers of nitrogen oxides.

Another object of the present invention is to achieve a drastic reduction in the amount of particular matter emitted by diesel engines. A significant drawback of diesels is particulate matter emission. Recycling of combustion gas deals with that problem very effectively. Since most of the combustion gas is recycled back into the engine cylinders over-and-over again, an average particle of gas goes through the combustion process many times before it is discharged into outside environment. In such operation, most of the particulate matter, which usually forms in the late stages of combustion, is repeatedly returned to the combustion chamber and is burned there. This removes another major disadvantage of diesel engines.

A further object of the present invention is to reduce the size of internal-combustion engines. The engine of the present invention can be considerably smaller than a conventional air-breathing engine with the same power capacity. This is because carbon dioxide, which is the main ingredient in the recycled combustion gas of the airless engine, is much heavier than nitrogen, which is the main ingredient in the intake air of a conventional air-breathing engine. Therefore, a smaller engine cylinder can receive the same mass of gas as a larger cylinder in a conventional engine using air at the same pressure and temperature. Direct injection of oxygen into the engine cylinder, after the intake valve closure, contributes to further reduction in engine size, since the cylinder becomes completely filled with recycled gas before oxygen is added. This increases the total mass of gas participating in combustion and permits a reduction in the size of the cylinder.

Yet another object of the present invention is to reduce the amount of unburned hydrocarbons and carbon monoxide emitted by internal combustion engines. The amount of harmful exhaust emissions, such as unburned hydrocarbons and carbon monoxide, is greatly reduced, since most of them are recycled back into the engine and burned there.

A further object of the present invention is to improve the fuel economy of internal combustion engines. For reasons listed above, the engine of the present invention can be smaller than a conventional air-breathing engine. A smaller engine has less friction and a much better fuel economy.

Another object of the present invention is to eliminate the need for turbochargers and superchargers in internal-combustion engines. The engine of the present invention does not require a turbocharger or a supercharger for boosted operation. It is inherently self-supercharging. Increasing restriction to flow through a pressure-control valve increases pressure of combustion gas recycled back into intake manifold and supercharges the engine.

Yet another object of the present invention is to reduce the cost of internal-combustion engines. Elimination of nitrogen oxides emission eliminates the need for an expensive nitrogen oxides emission control system. Substantial reduction in particulates and other harmful exhaust emissions leads to much smaller and cheaper filters and catalysts. Elimination of the need for expensive turbochargers or superchargers is another significant reduction in costs.

Still another object of the present invention is to increase acceptability of diesel engines in the market place. Complete elimination of nitrogen oxides coupled with a very substantial reduction in emission of particulate matter and other harmful pollutants, and a reduction in engine size without a need for a turbocharger or a supercharger makes the system and the method of the present invention very attractive for diesel engines. Diesel engines have a much better fuel economy than spark ignition engines that currently dominate passenger car fleet in this country. Increasing their acceptability in the market place can make a substantial contribution to reduced foreign oil import and to a reduction in carbon dioxide emission on a national scale.

SUMMARY

An internal-combustion engine receives no air from outside atmosphere. Instead, combustion gas expelled from the engine is cooled and recycled back into the engine. Oxygen and fuel are added to the recycled gas, and the resulting mixture is used to perform an internal-combustion cycle. A small amount of the expelled combustion gas is discharged through a pressure-control valve into outside environment, and the rest is recycled.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of diesel engines, which, in their conventional incarnations, are prodigious producers of nitrogen oxides.

Another drawback of diesels is particulate matter emission and this is greatly reduced too. Since most of the combustion gas is recycled back into the engine cylinders over-and-over again, an average particle of gas goes through the combustion process many times before it is discharged into outside environment. In such operation, most of the particulate matter is repeatedly returned to the combustion chamber and is burned there. This removes the second major disadvantage of diesel engines. The amount of other harmful exhaust emissions, such as unburned hydrocarbons and carbon monoxide, is greatly reduced too, since most of them are recycled back into the engine and burned there.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of oxygen into the engine cylinder, after the intake valve closure, contributes to further reduction in engine size, since the cylinder becomes completely filled with recycled gas before oxygen is added. This increases the total mass of gas participating in combustion and permits a reduction in the size of the cylinder. A smaller engine has less friction and a much better fuel economy.

The engine of the present invention does not require a turbocharger or a supercharger for boosted operation. It is inherently self-supercharging. Increasing restriction to gas flow through a pressure-control valve increases the pressure of combustion gas recycled back into the engine intake manifold. There is less pressure blowdown at the end of the expansion stroke and more gas cooling is required, but the net result is a greater mass of gas flowing into cylinder chambers. There is no shortage of gas, since the mass of gas exiting a cylinder chamber is always greater than the mass of gas entering that chamber. Elimination of a turbocharger or a supercharger is a substantial reduction in cost.

DESCRIPTION OF THE PREFERRED EMBODIMENT

The present invention can be applied to piston-type engines and to rotary-type engines such as gas turbines.

1. Piston-Type Engines

Figure 1:
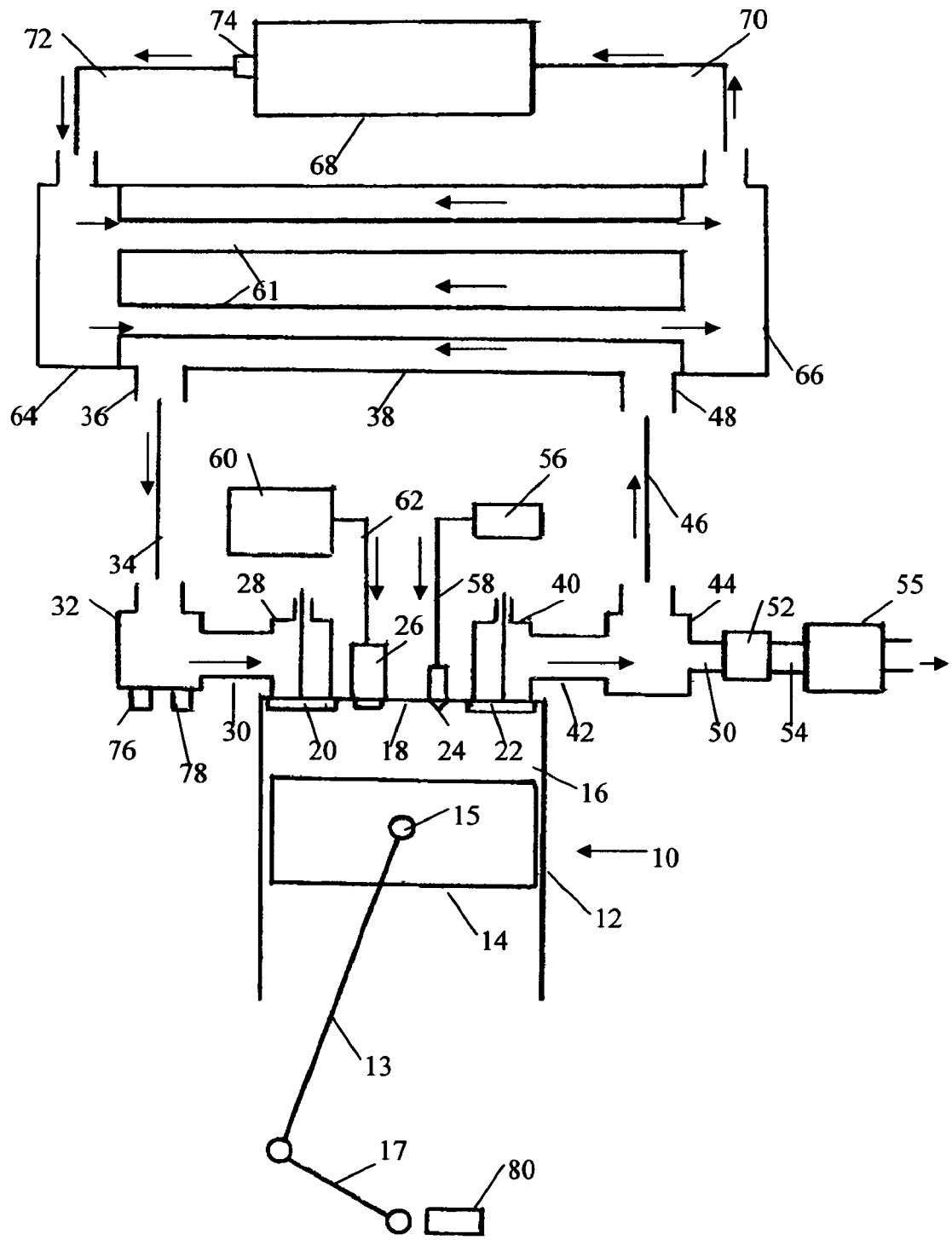
FIG. 1 is a schematic, cross-sectional side-view of an engine cylinder and head arrangement and its connections to sources of fuel and oxygen and to a combustion-gas cooler.
Figure 2:
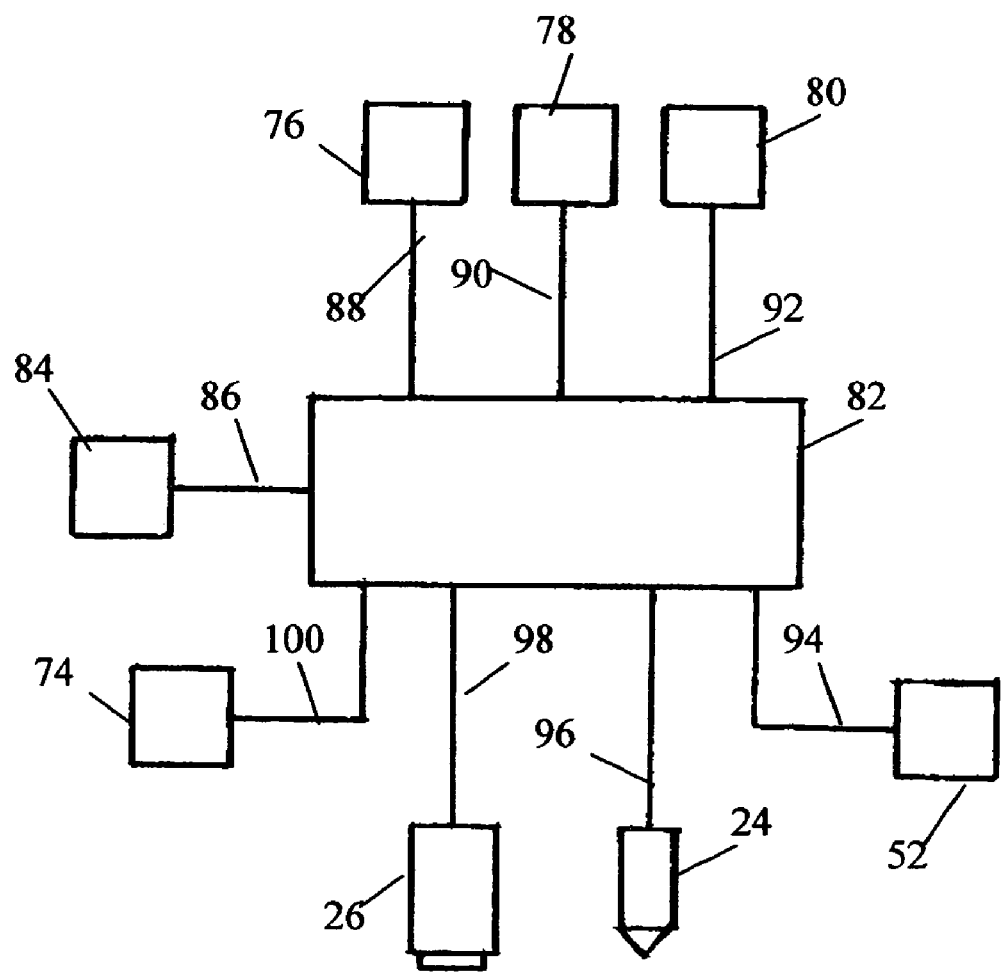
FIG. 2 is a schematic diagram illustrating a system of sensors sending input signals to the engine control system, which sends out output signals to actuators controlling operation of various components of the system.

A preferred embodiment of the present invention, as applied to a piston-type engine, is illustrated in FIGS. 1 and 2. FIG. 1 is a schematic, cross-sectional side-view of an engine cylinder and head arrangement and its connections to sources of fuel and oxygen and to a combustion-gas cooler. An engine 10 has at least one such cylinder. A cylinder 12 contains a piston 14, which is mounted upon a connecting rod 13 by a wrist pin 15 and can reciprocate in cylinder 12, thus varying the volume of a cylinder chamber 16 enclosed between piston 14 and a cylinder head 18 attached to the top of cylinder 12. Motion of piston 14 and of connection rod 13 is transmitted to crankshaft 17.

Two types of normally-closed valves, an intake valve 20 and an exhaust valve 22, are installed in cylinder head 18. The valves are operated by conventional means, such as camshafts (not shown). Depending on the needs of the engine, there may be more than one valve of each type in each engine cylinder. A fuel injector 24 and an oxygen injector 26 are also mounted within cylinder head 18 and protrude into cylinder chamber 16. Both fuel and oxygen injectors include actuators that can vary the magnitude, duration and timing of injector opening thus varying the timing of injection and the quantity of injected fuel or oxygen, as the case may be.

Intake valve 20 is shown in its closed position, in which it separates cylinder chamber 16 from an intake port 28 that opens into an intake passage 30. Intake passage 30 connects to an intake manifold 32, to which all intake ports and all intake passages from all engine cylinders are connected. Intake manifold 32 is connected, via a pipe 34, to an outlet 36 from a gas cooler 38.

Exhaust valve 22 is shown in its closed position in which it separates cylinder chamber 16 from an exhaust port 40 that opens into an exhaust passage 42. Exhaust passage 42 connects to an exhaust manifold 44, to which all exhaust ports and all exhaust passages from all engine cylinders are connected. Exhaust manifold 44 is connected, via a pipe 46, to an inlet 48 into gas cooler 38. Exhaust manifold 44 is also connected, via a passage 50 to a pressure-control valve 52, from which an exhaust pipe 54 leads to outside atmosphere. Pressure-control valve 52 includes a controllably variable restriction to the flow of gas into exhaust pipe 54. A throttle valve controlled by a position-control stepper motor can serve as pressure-control valve. An emission control module 55 may be incorporated into exhaust pipe 54. It may include a catalyst and a particulate matter filter.

Fuel injector 24 is connected, via a fuel line 58, to a fuel supply system 56. Oxygen injector 26 is connected, via an oxygen-supply line 62, to an oxygen-supply system 60. Both liquid and gaseous oxygen can be used. Oxygen can be stored in an on-site container that is periodically refilled or recharged.

Inside gas cooler 38, a multitude of cooling pipes 61 connects inlet chamber 64 to outlet chamber 66. A heat-rejection system 68 receives cooling fluid from outlet chamber 66, via a pipe 70 and, after heat rejection, pumps it into inlet chamber 64 via a control valve 74 and a pipe 72. Control valve 74 includes a controllable restriction that controls the flow of fluid from heat-rejection system 68 into inlet chamber 64.

Temperature and pressure sensors 76 and 78, respectively, are mounted into intake manifold 32. They measure the temperature and the pressure of the gas inside the intake manifold. A speed sensor 80 mounted in the vicinity of crankshaft 17 measures the engine speed.

FIG. 2 is a schematic diagram illustrating a system of sensors sending input signals to the engine control system, which sends out output signals to actuators controlling operation of various components of the system. The signals generated by the sensors inform the control system about engine operator's demands for specific engine power and speed, as the case may be. The input signals also carry information on physical and operational conditions in various parts and components of the engine. The control system evaluates the received information and, in accordance with its internal logic, controls operation of the engine and its components, so as to satisfy the operator's demands while maintaining optimum fuel consumption efficiency and minimum exhaust emissions.

A control system 82 (FIG. 2) is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 82 is connected to a control implement 84 via an electric wire 86. Control implement 84 is a device that permits the engine operator to manually control the engine operation by sending an appropriate control signal to the engine control system specifying the operator's demand for a specific engine power and speed. Control system 82 also receives input signals from intake manifold temperature and pressure sensors 76 and 78, respectively, to which it is connected via electric wires 88 and 90, respectively. It also receives an input signal from engine speed sensor 80 via an electric wire 92. Output signals go out of control system 82 to pressure-control valve 52 via an electric wire 94, to fuel injector 24 via an electric wire 96, to oxygen injector 26 via an electric wire 98 and to control valve 74 via an electric wire 100.

Figure 3:
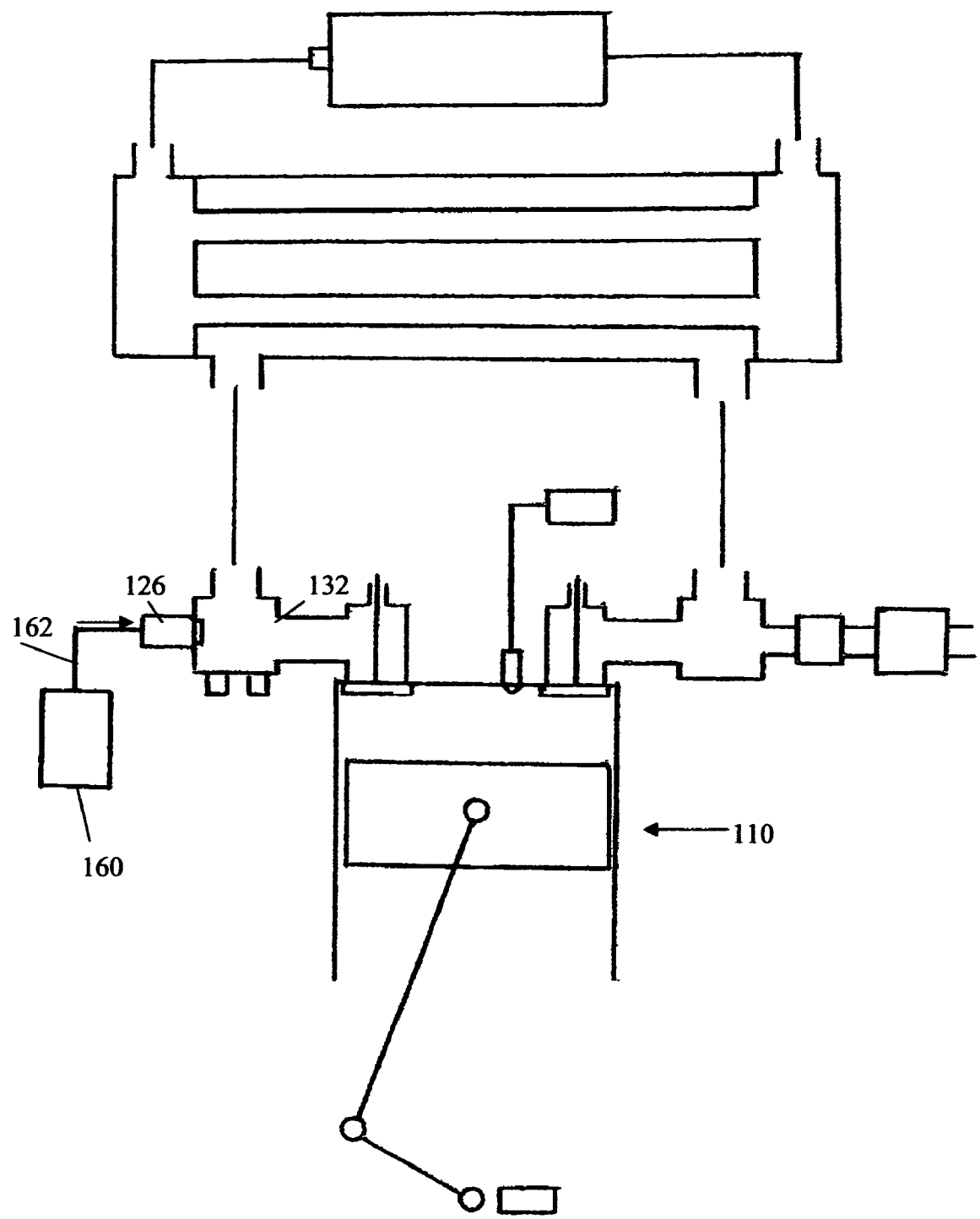
FIG. 3 is a schematic, cross-sectional side-view of another variant of the engine of the present invention, in which oxygen is added to the recycled combustion gas before the gas enters the engine cylinder chamber.
Figure 4:
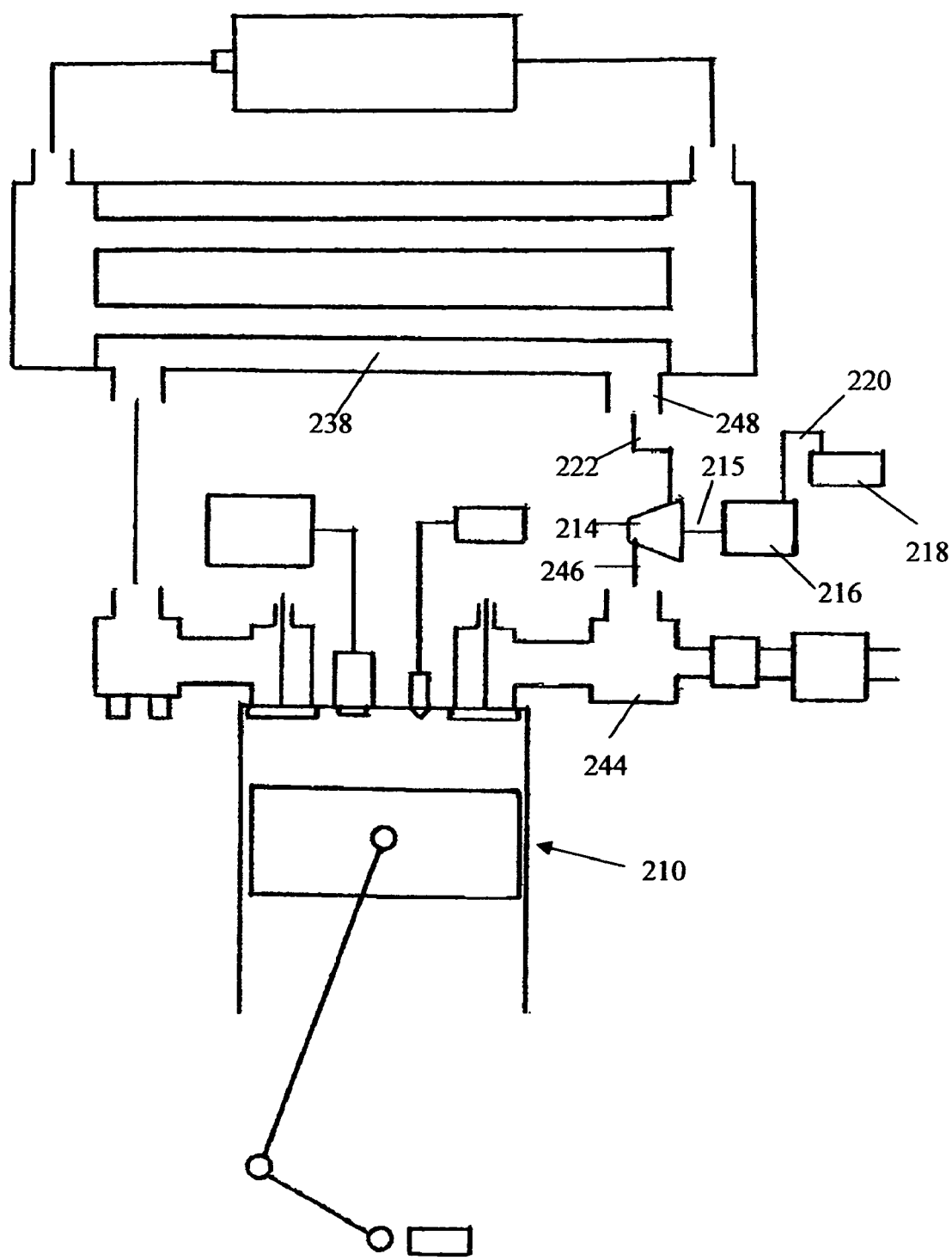
FIG. 4 is a schematic, cross-sectional side-view of still another variant of the engine of the present invention, in which some of the combustion gas energy is used for electric power generation.

While FIG. 1 illustrates the basic design of the preferred embodiment, some other variants of the basic design are illustrated in FIGS. 3 and 4.

FIG. 3 is a schematic, cross-sectional side-view of another variant of the engine of the present invention, in which oxygen is added to the recycled combustion gas before the gas enters the engine cylinder chamber. In an engine 110 there is no oxygen injector in the engine cylinder head. Instead, an oxygen injector 126 is installed in an intake manifold 132, and it is connected to an oxygen-supply system 160 via an oxygen-supply line 162. In all other respects, engine 110 is identical to engine 10 (FIG. 1).

FIG. 4 is a schematic, cross-sectional side-view of still another variant of the engine of the present invention, in which some of the combustion gas energy is used for electric power generation. In engine 210 (FIG. 4), hot combustion gas flowing out from an exhaust manifold 244 through a pipe 246 is diverted into a turbo-generator that includes a gas turbine 214 coupled, via a shaft 215, to an electric generator 216 that is connected to an electric battery 218 via an electric wire 220. From gas turbine 214 the gas flows into a gas cooler 238 via a pipe 222 and an inlet 248. In all other respects, engine 210 is identical to engine 10 (FIG. 1).

2. Gas-Turbine Engine

Figure 5:
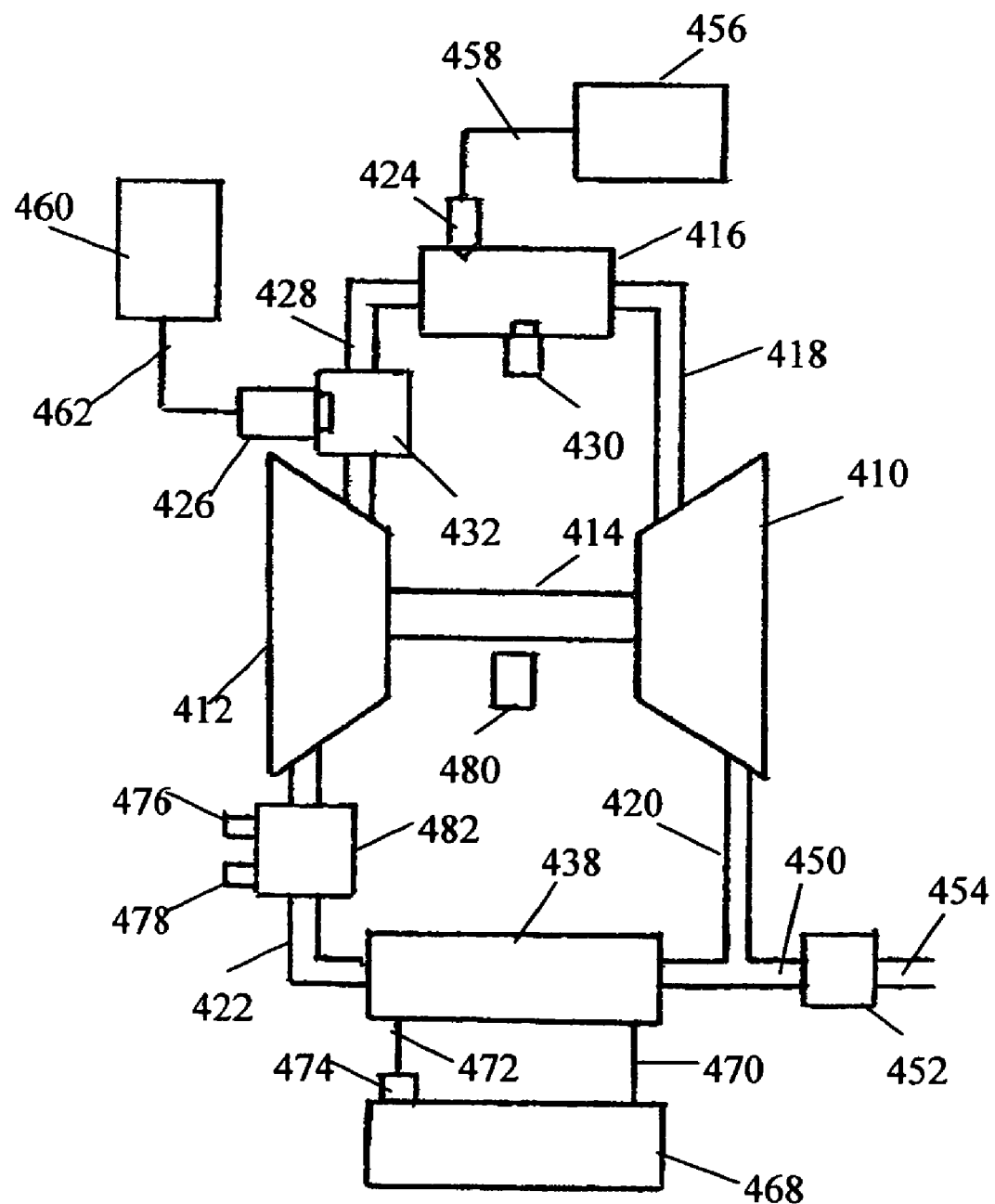
FIG. 5 is a schematic diagram of a gas turbine coupled to a compressor and connected to a combustor and to a combustion-gas cooler according to the present invention.
Figure 6:
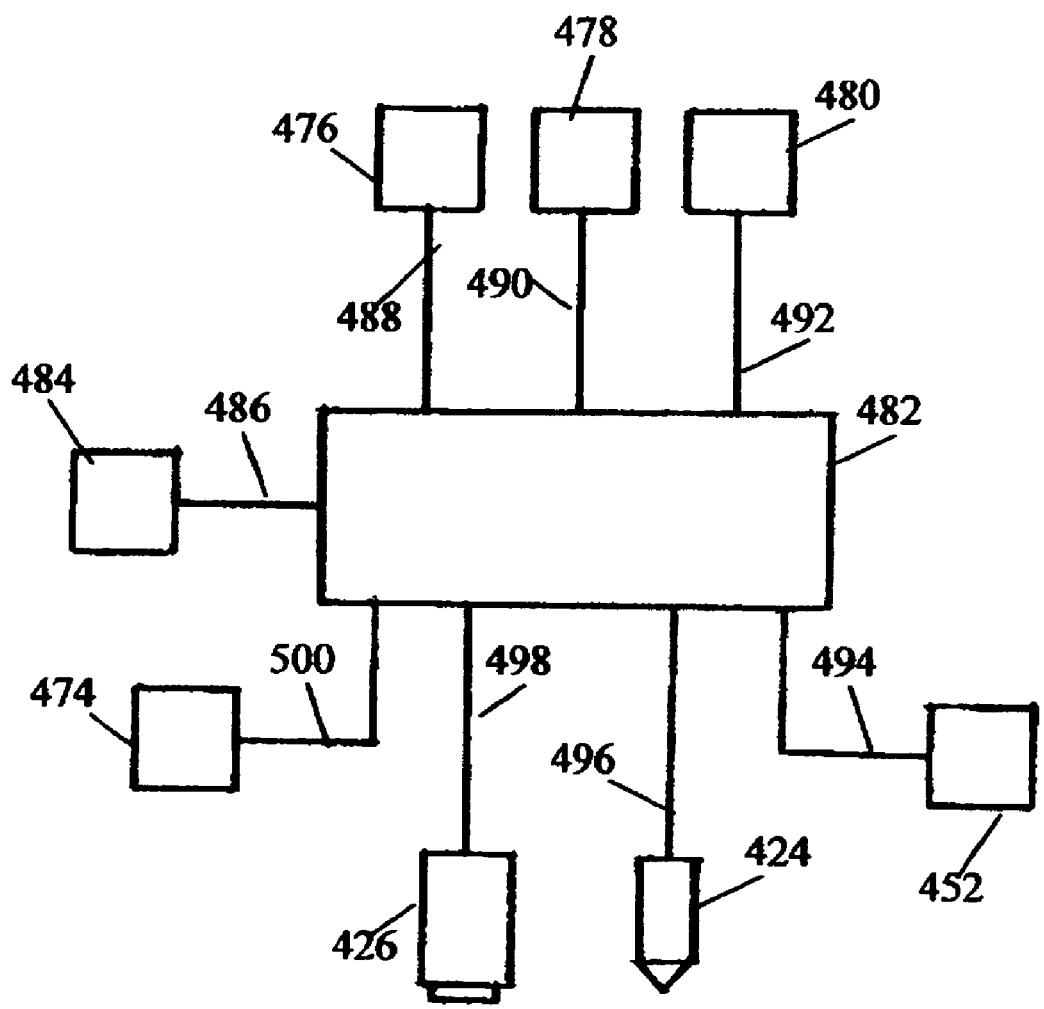
FIG. 6 is a schematic diagram illustrating a system of sensors sending input signals to the gas turbine control system, which sends out output signals to actuators controlling operation of various components of the turbine system.

A preferred embodiment of the present invention, as applied to a gas-turbine engine, is illustrated in FIGS. 5 and 6. FIG. 5 is a schematic diagram of a gas turbine coupled to a compressor and connected to a combustor and to a combustion-gas cooler according to the present invention. The system also includes sources of fuel and oxygen.

A gas turbine 410 is coupled to a compressor 412 through a shaft 414. Shaft 414 can also be used to drive a device performing a useful function (not shown), such as a pump, an electric generator, etc. Gas turbine 410 is connected to a combustor 416 via an inlet pipe 418 and to a gas cooler 438 via an outlet pipe 420. Outlet pipe 420 is also connected, via a passage 450, to a pressure-control valve 452, from which an exhaust pipe 454 leads to outside atmosphere. Pressure-control valve 452 includes a controllably-variable restriction to the flow of gas into exhaust pipe 454. Compressor 412 is connected to gas cooler 438 via am inlet pipe 422 and compressor inlet chamber 482, and to combustor 416 via a compressor outlet chamber 432 and an outlet pipe 428. A fuel injector 424 and an igniter 430 are installed in combustor 416, and an oxygen injector 426 is installed in compressor outlet chamber 432. Fuel injector 424 is connected, via a fuel line 458, to a fuel supply system 456. Oxygen injector 426 is connected, via an oxygen-supply line 462, to an oxygen-supply system 460. Both liquid and gaseous oxygen can be used. Oxygen can be stored in an on-site container that is periodically refilled or recharged.

Inside gas cooler 438, a multitude of cooling pipes (not shown) carries cooling fluid. A heat-rejection system 468 receives cooling fluid from gas cooler 438, via a pipe 470 and, after heat rejection, pumps it back into gas cooler 438 via a control valve 474 and a pipe 472. Control valve 474 includes a controllable restriction that controls the flow of fluid from heat-rejection system 468 into gas cooler 438.

Temperature and pressure sensors 476 and 478, respectively, are mounted into compressor inlet chamber 482. They measure the temperature and the pressure of the gas inside the chamber. A speed sensor 480 mounted in the vicinity of shaft 414 measures the turbine speed.

FIG. 6 is a schematic diagram illustrating a system of sensors sending input signals to the gas turbine control system, which sends out output signals to actuators controlling operation of various components of the turbine system. The signals generated by the sensors inform the control system about turbine operator's demands for specific turbine power and speed, as the case may be. The input signals also carry information on physical and operational conditions in various parts and components of the system. The control system evaluates the received information and, in accordance with its internal logic, controls operation of the turbine system and its components, so as to satisfy the operator's demands while maintaining optimum fuel consumption efficiency and minimum exhaust emissions.

A control system 482 (FIG. 6) is an on-board computer programmed to control operation of various components of the turbine system in accordance with a strategy program incorporated into its software. The software contains algorithms and data that permit the control system to evaluate the stream of input signals and determine the magnitude and the timing of each output signal. The output signals control operation of the turbine system and its components and are updated at least once every engine cycle.

Control system 482 is connected to a control implement 484 via an electric wire 486. Control implement 484 is a device that permits the turbine operator to manually control the turbine operation by sending an appropriate control signal to the gas turbine control system specifying the operator's demand for a specific turbine power and speed. Control system 482 also receives input signals from temperature and pressure sensors 476 and 478, respectively, to which it is connected via electric wires 488 and 490, respectively. It also receives an input signal from engine speed sensor 480 via an electric wire 492. Output signals go out of control system 482 to pressure-control valve 452 via an electric wire 494, to fuel injector 424 via an electric wire 496, to oxygen injector 426 via an electric wire 498 and to control valve 474 via an electric wire 500.

Figure 7:
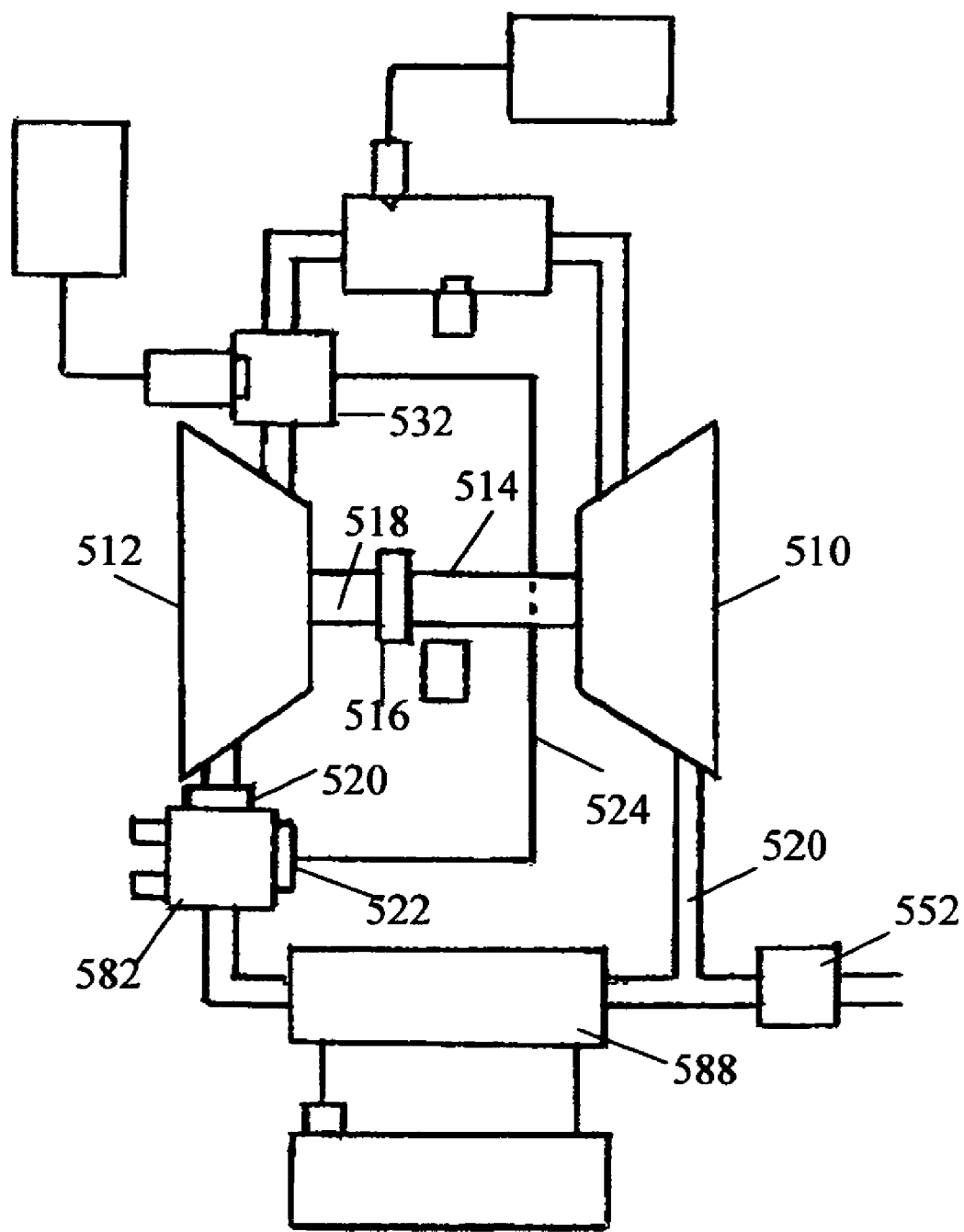
FIG. 7 is a schematic, diagram of another variant of a gas turbine system of the present invention, in which the flow of recycled combustion gas can bypass the compressor.

While FIG. 5 illustrates the basic design of the preferred embodiment, other variants of the basic design are possible. FIG. 7 is a schematic, diagram of another variant of a gas turbine system of the present invention, in which the flow of recycled combustion gas can bypass the compressor.

A gas turbine 510 (FIG. 7) can be connected to a compressor 512 through a shaft 514, a coupling 516 and a shaft 518. Coupling 516 is a connect/disconnect device, such as a clutch, which can selectively connect or disconnect shafts 514 and 518. Two valves, 520 and 522, are installed in a compressor inlet chamber 582, and a bypass pipe 524 connects valve 522 to a compressor outlet chamber 532. In all other respects, the above system is identical to the system illustrated in FIG. 5.

DESCRIPTION OF OPERATION

1. Piston-Type Engine

The engine of the present invention receives no air from outside atmosphere. Instead, combustion gas expelled from the engine is cooled and recycled back into the engine. That gas contains no nitrogen and consists mostly of carbon dioxide and water vapor. When oxygen is added to such gas, it forms a kind of "artificial air" that can be used for combustion in the engine. Oxygen and fuel are added to the recycled gas, and the resulting mixture is used to perform an internal-combustion cycle. A small amount of the expelled combustion gas is discharged into outside environment, and the rest is recycled. A more detailed description of the engine operation is given below, with references to FIGS. 1 and 2.

Engine 10 (FIG. 1) operates in a gas-recycling mode that requires no air induction into the engine. It inducts cooled combustion gas from gas cooler 38 into cylinder chamber 16 during piston 14 first volume-increasing stroke, when piston 14 moves away from cylinder head 18. During the first volume-increasing stroke, intake valve 20 is open while exhaust valve 22 is closed, and gas flows from gas cooler 38 through outlet 36, pipe 34, intake manifold 32, intake passage 30, intake port 28 and intake valve 20 into cylinder chamber 16. During a subsequent first volume-decreasing stroke, when piston 14 moves towards cylinder head 18, both intake valve 20 and exhaust valve 22 are closed and the gas inside cylinder chamber 16 is compressed. Oxygen is injected through oxygen injector 26 into cylinder chamber 16 during the early part of the volume-decreasing stroke, and fuel is injected through fuel injector 24 into cylinder chamber 16 during late part of the volume-decreasing stroke. As a result, a combustible mixture of recycled gas, oxygen and fuel forms inside cylinder chamber 16. Oxygen is supplied to oxygen injector 26 from oxygen-supply system 60 via oxygen-supply line 62. Fuel is supplied to fuel injector 24 from fuel-supply system 56 via fuel-supply line 58.

As piston 14 approaches its top-dead-center position (TDC), the combustible mixture is ignited and its combustion begins. Compression ignition is the preferred method of ignition, but other means for assisting or inducing the ignition, such as glow plugs and spark plugs, can be used too. Combustion is completed during early part of a second volume-increasing stroke and the combustible mixture turns into a high-pressure hot combustion gas. During the remaining part of that stroke, expanding combustion gas performs mechanical work on piston 14. As piston 14 approaches its bottom-dead-center position (BDC), exhaust valve 22 opens, and pressure in cylinder chamber 16 drops to the level of pressure in exhaust manifold 44.

During a second volume-decreasing stroke, exhaust valve 22 is open while intake valve 20 is closed, and hot combustion gas is expelled from cylinder chamber 16 and flows into gas cooler 38. The gas flows from cylinder chamber 16 through exhaust valve 22, exhaust port 40, exhaust passage 42, exhaust manifold 44, pipe 46 and inlet 48 into gas cooler 38. A small fraction of the gas is discharged from exhaust manifold 44 through passage 50 and pressure-control valve 52 into exhaust pipe 54 that is connected to outside atmosphere.

The mass of gas inducted into cylinder chamber 16, via intake manifold 32, must be equal to the mass displaced into gas cooler 38 from exhaust manifold 44. The mass of gas discharged from cylinder chamber 16 into exhaust manifold 44 is equal to the mass inducted into cylinder chamber 16 plus the mass of oxygen and fuel injected. Therefore, on average, the mass of gas discharged through pressure-control valve 52 is equal to the mass of fuel and oxygen injected into the engine cylinders, and the rest of the gas flows into gas cooler 38. If the area of the controllable restriction incorporated into pressure-control valve 52 is decreased or increased, the flow of gas through pressure-control valve 52 temporarily decreases or increases, respectively, and the pressure of gas in exhaust manifold 44 increases or decreases, respectively, until the flow through pressure-control valve 52 is restored. In that way, pressure of gas flowing into cylinder chamber 16 can be controlled. Controlling the pressure of the recycled gas controls the mass of gas inducted into the engine.

Inside gas cooler 38, hot combustion gas comes into contact with a multitude of cooling pipes 61 and looses a substantial portion of its heat to cooling fluid flowing inside cooling pipes 62. Cooled combustion gas exits gas cooler 38 through outlet 36 and flows back into the engine, where the above cycle is repeatedly performed in each engine cylinder.

Heat-rejection system 68 pumps cooling fluid through gas cooler 38. The cooling fluid absorbs heat from combustion gas in gas cooler 38 and rejects that heat to outside environment in heat-rejection system 68. Cooling fluid flows from heat-rejection system 68 through control valve 74, pipe 72, inlet chamber 64 and multitude of cooling pipes 61 into outlet chamber 66. From there, it returns to heat-rejection system 68 via pipe 70. Operation of heat-rejection system 68 can be similar to operation of a conventional engine cooling system, which usually includes an air blower blowing atmospheric air through a radiator that carries the cooling fluid. In most cases, heat-rejection system 68 may be integrated with the rest of the engine cooling system.

Control of the engine operation is illustrated in FIG. 2. Control system 82 is an on-board computer programmed to control operation of various components of the engine in accordance with a strategy program incorporated into its software. The software contains algorithms and data that permit the control system to evaluate the stream of input signals and determine the magnitude and the timing of each output signal. The output signals control operation of the engine and its components and are updated at least once every engine cycle.

Control system 82 receives a control signal via electric wire 86 from control implement 84, which specifies the engine operator's demand for a specific engine power and speed. The control system evaluates the received information and, in accordance with its internal logic, controls operation of the engine and its components, so as to satisfy the operator's demands while maintaining optimum fuel consumption efficiency and minimum exhaust emissions. Control system 82 also receives input signals from intake manifold temperature and pressure sensors 76 and 78, respectively, to which it is connected via electric wires 88 and 90, respectively. It also receives an input signal from engine speed sensor 80 via an electric wire 92.

Control system 82 controls operation of engine 10 (FIG. 1) by varying the quantity of fuel and oxygen injected into cylinder chamber 16 during each cycle. It also controls the pressure and temperature of the recycled combustion gas flowing back into the engine. The injected fuel quantity is controlled by sending a control signal to fuel injector 24 via electric wire 96. That signal controls the duration of the injector opening, and the timing of the signal determines the timing of the injection. The injected oxygen quantity is controlled by sending a control signal to oxygen injector 26 via electric wire 98. That signal controls the duration of the injector opening, and the timing of the signal determines the timing of the injection. The temperature of gas flowing into intake manifold 32 (FIG. 1) is controlled by a signal sent to control valve 74 via electric wire 100. This controls the flow of cooling fluid through gas cooler 38 and varies the amount of heat absorbed from the gas by the cooling fluid. The pressure of gas flowing into intake manifold 32 (FIG. 1) is controlled by a signal sent to pressure-control valve 52 via electric wire 94 That varies the variable restriction incorporated into pressure-control valve 52 and controls the flow of gas discharged into outside atmosphere. This controls the pressure in exhaust manifold 44, and since intake manifold 32 is directly connected to exhaust manifold 44 via gas cooler 38, it indirectly controls the pressure of the gas flowing into intake manifold 32.

The engine of the present invention does not require a turbocharger or a supercharger for boosted operation. It is inherently self-supercharging. Increasing restriction to flow through pressure-control valve 52 (FIG. 1) increases pressure of combustion gas recycled back into intake manifold 32 (FIG. 1). There is less pressure blowdown at the end of the second volume-increasing stroke and more cooling is required in gas cooler 38 (FIG. 1), but the net result is a greater mass of gas flowing into cylinder chamber 16 (FIG. 1). There is no shortage of gas, since the mass of gas exiting cylinder chamber 16 is always greater than the mass of gas entering that chamber. The quantity of injected fuel and oxygen can be adjusted independently of recycled gas control. Elimination of a turbocharger or a supercharger is a substantial reduction in cost.

2. Gas-Turbine Engine

The gas-turbine system of the present invention receives no air from outside atmosphere. Instead, fuel and oxygen are added to combustion gas expelled from the turbine, which turns it into a combustible mixture that is burned in a combustor and recycled back to the turbine. A small amount of the expelled combustion gas is discharged into outside environment, and the rest is recycled. A more detailed description of the system operation is given below, with references to FIGS. 5-7.

Gas turbine 410 (FIG. 5) operates in a gas-recycling mode that requires no air induction from outside atmosphere. Oxygen and fuel are added to recycled combustion gas thus forming a combustible mixture that is burned in combustor 416 producing a very hot combustion gas that is used to power gas turbine 410. Gas exiting gas turbine 410 is cooler than gas entering the turbine, but it is still hot and needs cooling.

From gas turbine 410, most of the still hot combustion gas flows through outlet pipe 420 into gas cooler 438, while a smaller quantity of that gas is discharged through passage 450 and pressure-control valve 452 into exhaust pipe 454 leading to outside atmosphere. That smaller quantity of exhaust gas is equal to the mass of oxygen and fuel that was added to the recycled gas.

Inside gas cooler 438, hot combustion gas comes into contact with a multitude of cooling pipes (not shown) and looses a substantial portion of its heat to cooling fluid flowing inside the cooling pipes. Cooled combustion gas exits gas cooler 438 and flows into compressor 412.

Gas turbine 410 drives compressor 412 through shall 414. Compressor 412 continuously inducts cooled combustion gas from gas cooler 438 via inlet pipe 422 and inlet chamber 482, compresses it and pumps it into combustor 416 via outlet chamber 432 and outlet pipe 428. Oxygen is injected through oxygen injector 426 into gas flowing through outlet chamber 432. Oxygen is supplied to oxygen injector 426 from oxygen-supply system 460 via oxygen-supply line 462. Fuel is injected through fuel injector 424 into combustor 416 thus feeding a continuous combustion inside the combustor. Igniter 430 is used only to initiate the combustion. Fuel is supplied to fuel injector 424 from fuel-supply system 456 via fuel-supply line 458.

Very hot combustion gas flows from combustor 416 through inlet pipe 418 into gas turbine 410, where it expands and performs mechanical work on the turbine blades causing the turbine to rotate.

Heat-rejection system 468 pumps cooling fluid through gas cooler 438. The cooling fluid absorbs heat from combustion gas in gas cooler 438 and rejects that heat to outside environment in heat-rejection system 468. Cooling fluid flows from heat-rejection system 468 through control valve 474 and pipe 472 into gas cooler 438. From there, it returns to heat-rejection system 468 via pipe 470. Operation of heat-rejection system 468 can be similar to operation of a conventional engine cooling system, which usually includes an air blower blowing atmospheric air through a radiator that carries the cooling fluid. In most cases, heat-rejection system 468 may be integrated with the rest of the engine cooling system.

Control of operation of the turbine system shown in FIG. 5 is illustrated in FIG. 6. Control system 482 is an on-board computer programmed to control operation of various components of the gas-turbine engine in accordance with a strategy program incorporated into its software. The software contains algorithms and data that permit the control system to evaluate the stream of input signals and determine the magnitude and the timing of each output signal. The output signals control operation of the gas-turbine system and its components and are frequently updated.

Control system 482 receives a control signal via electric wire 486 from control implement 484, which specifies the engine operator's demand for a specific turbine power and speed. The control system evaluates the received information and, in accordance with its internal logic, controls operation of the gas turbine and its components, so as to satisfy the operator's demands while maintaining optimum fuel consumption efficiency and minimum exhaust emissions. Control system 482 also receives input signals from temperature and pressure sensors 476 and 478, respectively, to which it is connected via electric wires 488 and 490, respectively. It also receives an input signal from speed sensor 480 via electric wire 492.

Control system 482 controls operation of gas turbine 410 (FIG. 5) by varying the quantity of fuel and oxygen injected into the recycled combustion gas. It also controls the pressure and temperature of the recycled combustion gas flowing back into compressor 412. The injected fuel quantity is controlled by sending a control signal to fuel injector 424 via electric wire 496. That signal controls the rate of fuel flow through the injector. The injected oxygen quantity is controlled by sending a control signal to oxygen injector 426 via electric wire 498. That signal controls the rate of oxygen flow. The temperature of gas flowing into compressor 412 (FIG. 5) is controlled by a signal sent to control valve 474 via electric wire 500. This controls the flow of cooling fluid through gas cooler 438 and varies the amount of heat absorbed from the gas by the cooling fluid. The pressure of gas flowing into gas cooler 438 (FIG. 5) is controlled by a signal sent to pressure-control valve 452 via electric wire 494 That varies the variable restriction incorporated into pressure-control valve 452 and controls the pressure drop across the restriction. This controls the pressure in outlet pipe 420 and gas cooler 438. It also indirectly controls pressure in outlet pipe 428 leading into combustor 416.

The gas turbine of the present invention can operate without a compressor, since it itself can produce the necessary gas pressure. This is illustrated in the variant of the system shown in FIG. 7. In the system shown in FIG. 7, gas turbine 510 can selectively operate with or without using compressor 512. If coupling 516 connects shafts 514 and 518, valve 520 is open and valve 522 is closed; compressor 512 is driven by gas turbine 510 and the recycled combustion gas flows through valve 520 and compressor 512. In that case, the system operates in the same way as the system previously described and illustrated in FIG. 5. If, however, coupling 516 disconnects shafts 514 and 518, valve 520 is closed and valve 522 is open, then compressor 512 stops working, and combustion gas bypasses the compressor. The gas flows from compressor inlet chamber 582, through valve 522 and bypass pipe 524 directly into compressor outlet chamber 532. Control system 482 (FIG. 6) determines when gas pressure produced by pressure control valve 552 is sufficient for compressor 512 to be deactivated and bypassed and takes appropriate action as dictated by its control program.

Increasing restriction to flow through pressure-control valve 552 (FIG. 7) increases pressure of combustion gas recycled back into gas cooler 538. There is less pressure blowdown from the turbine into outlet pipe 520, and more cooling is required in gas cooler 538 (FIG. 7), but the net result is a greater pressure and mass of gas flowing into gas turbine 510 (FIG. 7). There is no shortage of gas, since the mass of gas exiting gas turbine 510 is always greater than the mass of gas entering gas cooler 538. Thus the gas turbine of the present invention can be inherently self-supercharging. The quantity of injected fuel and oxygen can be adjusted independently of recycled gas control. Operating without the compressor improves the efficiency of the system.

CONCLUSION, RAMIFICATIONS AND SCOPE

The method and the system of the present invention can be especially useful when applied to diesel engines. Such application can substantially improve diesel engine emissions, fuel economy and performance, while reducing the engine size.

Since no air is inducted into the engine, no nitrogen takes part in the combustion process. The combustion gas recycled back into the engine consists mostly of carbon dioxide and water vapor. Since no nitrogen is present, no nitrogen oxides are produced. This removes one of the most significant deficiencies of diesel engines, which, in their conventional incarnations, are prodigious producers of nitrogen oxides.

Another drawback of diesels is particulate matter emission and this is greatly reduced too. Since most of the combustion gas is recycled back into the engine cylinders over-and-over again, an average particle of gas goes through the combustion process many times before it is discharged into outside environment. In such operation, most of the particulate matter, which usually forms in the late stages of combustion, is repeatedly returned to the combustion chamber and is burned there. This removes the second major disadvantage of diesel engines. The amount of other harmful exhaust emissions, such as unburned hydrocarbons and carbon monoxide, is greatly reduced too, since most of them are recycled back into the engine and burned there.

The engine of the present invention can be considerably smaller than a conventional air-breathing engine with the same power capacity. This is because carbon dioxide, which is the main ingredient in the recycled combustion gas of the above described engine, is much heavier than nitrogen, which is the main ingredient in the intake air of a conventional engine. Therefore, a smaller engine cylinder can receive the same mass of gas as a larger cylinder in a conventional engine using air at the same pressure and temperature. Direct injection of oxygen into the engine cylinder, after the intake valve closure, contributes to further reduction in engine size, since the cylinder becomes completely filled with recycled gas before oxygen is added. This increases the total mass of gas participating in combustion and permits a reduction in the size of the cylinder. A smaller engine has less friction and a much better fuel economy.

The engine of the present invention does not require a turbocharger or a supercharger for boosted operation. It is inherently self-supercharging. Elimination of a turbocharger or a supercharger is a substantial reduction in cost.

Complete elimination of nitrogen oxides coupled with a very substantial reduction in emission of particulate matter and other harmful pollutants, and a reduction in engine size without a need for a turbocharger or a supercharger makes the system and the method of the present invention very attractive for diesel engines. Diesel engines have a much better fuel economy than spark ignition engines that currently dominate passenger car fleet in this country. Increasing their acceptability in the market place can make a substantial contribution to reduced foreign oil import and to a reduction in carbon dioxide emission on a national scale.

Although the description above contains much specificity, this should not be construed as limiting the scope of the invention, but as merely providing illustrations of some of the presently preferred embodiments of this invention. For example, although the preferred arrangement illustrated in FIG. 1 anticipates direct injection of oxygen into the cylinder chamber, in other cases oxygen may be added to the recycled combustion gas before the gas enters the combustion chamber. Such a case is illustrated in FIG. 3. FIG. 3 illustrates engine 110, in which oxygen is injected into the engine intake manifold. Oxygen injector 126 receives oxygen from oxygen-supply system 160 via oxygen-supply line 162 and injects it into recycled combustion gas inside intake manifold 132. This contributes to better mixing of oxygen with the gas flowing into the engine cylinders. In some other cases, oxygen may be injected into intake ports. In other cases, fuel too may be injected into the recycled gas before it enters the engine cylinder.

In other cases, some of the energy of the hot combustion gas exiting the engine cylinders may be used to generate electricity or for some other useful purpose. Such a case is illustrated in FIG. 4. In engine 210, hot combustion gas flows from exhaust manifold 244 through pipe 246 into gas turbine 214 that drives electric generator 216 via shaft 215. From gas turbine 214, gas flows into gas cooler 238 via pipe 222 and inlet 248. Electric power generated by electric generator 216 is transferred to electric battery 218 via electric wire 220 and is stored there. Electric energy accumulated in electric battery 218 can be used to satisfy electric needs of the engine system and to drive some auxiliary devices, such as pumps, blowers, etc. In some cases, auxiliary devices may be driven directly by the above gas turbine. Relieving the engine of the task to generate electric energy for its own consumption and to drive auxiliary devices improves the engine fuel economy.

The preferred arrangement illustrated in FIG. 1 anticipates that pressure of gas flowing into intake manifold 32 is controlled by controlling pressure-control valve 52. In some other cases, the pressure control system may also include a controllable throttle valve installed at the inlet to intake manifold 32 or at the inlet to gas cooler 38. This broadens the range of gas-pressure control to include pressures that are lower than atmospheric pressure.

Description of the engine shown in FIG. 1 anticipates that oxygen is stored in an on-site container, which is periodically refilled or recharged. In some other cases, oxygen can be produced on-site out of atmospheric air by using one of the known methods of oxygen production, such as, for example, the method, in which the air is liquefied and then nitrogen is boiled off. This can produce 99.99% pure oxygen. Other methods of oxygen production can be used too.

Thus the scope of the invention should be determined by the appended claims and their legal equivalents, rather than by the examples given.

I claim:

1. A method for operating an internal-combustion engine, said method comprising the steps of
   (a) providing an internal-combustion engine that uses recycled combustion gas instead of air, said engine including:
      (1) at least one cylinder,
      (2) a cylinder chamber within said at least one cylinder, and
      (3) a piston that can reciprocate in said at least one cylinder, whereby volume of said cylinder chamber can be varied,
   (b) providing a gas-cooling means for receiving, cooling and discharge of said engine combustion gas,
   (c) providing a gas-intake means for selectively connecting said cylinder chamber to said gas-cooling means and for receiving cooled combustion gas from said gas-cooling means into said cylinder chamber in timed relation to said engine operation,
   (d) providing a gas-exhaust means for selectively connecting said cylinder chamber to said gas-cooling means and for discharging hot combustion gas from said cylinder chamber into said gas-cooling means in timed relation to said engine operation,
   (e) providing an oxygen-delivery means for adding oxygen to said combustion gas,
   (f) providing a fuel-delivery means for adding fuel to said combustion gas, (g) providing a pressure-control means for controlling the pressure of said recycled combustion gas and for discharging excess combustion gas through an exhaust pipe into outside atmosphere, (h) providing a control means for controlling the operation of said internal-combustion engine in response to operator's demands and in accordance with a control program incorporated in said control means, (i) operating said engine in a gas-recycling mode by repeatedly performing an engine cycle that includes the steps of:
  (1) receiving said cooled combustion gas from said gas-cooling means into said cylinder chamber,
  (2) adding oxygen and fuel to said cooled combustion gas, whereby a combustible mixture forms,
  (3) using said combustible mixture to perform an internal-combustion cycle in said cylinder chamber, whereby said hot combustion gas forms,
  (4) transferring said hot combustion gas from said cylinder chamber into said gas-cooling means, and
  (5) discharging excess combustion gas through said pressure-control means into outside atmosphere, and
  (6) cooling said hot combustion gas in said gas-cooling means, whereby said hot combustion gas turns into said cooled combustion gas, and (j) using said control means for control of operation of said internal-combustion engine, whereby said engine operates without receiving air from outside atmosphere, whereby said combustible mixture contains no nitrogen, whereby no nitrogen oxides are produced in said engine, and whereby harmful exhaust emissions are recycled back into said engine and burned there.

2. The method of claim 1 wherein the mass of said excess combustion gas discharged into outside atmosphere is equal to the mass of oxygen and fuel added to said recycled combustion gas.

3. The method of claim 1 wherein:
(a) said pressure-control means includes a controllably-variable restriction to the flow of said excess combustion gas, and
(b) said control of operation of said internal-combustion engine includes controlling said controllably-variable restriction,
whereby pressure of said hot combustion gas is controlled,
whereby pressure of said cooled combustion gas is controlled,
whereby the mass of said recycled combustion gas is controlled, and
whereby said engine is controllably supercharged.

4. The method of claim 1 wherein:
(a) said gas-cooling means includes a flow of cooling fluid and means for control of operation of said gas-cooling means by controlling said flow of cooling fluid through said gas-cooling means, and
(b) said control of operation of said gas-cooling means includes controlling said flow of cooling fluid,
whereby temperature of said cooled combustion gas is controlled.

5. The method of claim 1 wherein oxygen and fuel are added to said cooled combustion gas after said cooled combustion gas is received into said cylinder chamber.

6. The method of claim 1 wherein oxygen is added to said cooled combustion gas before said cooled combustion gas is received into said cylinder chamber.

7. The method of claim 1 wherein said gas-exhaust means includes a gas turbine driven by said hot combustion gas, said gas turbine driving an electric generator that charges an electric battery.

8. The method of claim 1 wherein said exhaust pipe includes emission control means for controlling harmful exhaust emissions contained in said excess combustion gas.

9. A system for operating an internal-combustion engine, said system comprising:
(a) an internal-combustion engine that uses recycled combustion gas instead of air, said engine including:
  (1) at least one cylinder,
  (2) a cylinder chamber within said at least one cylinder, and
  (3) a piston that can reciprocate in said at least one cylinder, whereby volume of said cylinder chamber can be varied,
(b) a gas-cooling means for receiving, cooling and discharge of said engine combustion gas,
(c) a gas-intake means for selectively connecting said cylinder chamber to said gas-cooling means and for receiving cooled combustion gas from said gas-cooling means into said cylinder chamber in timed relation to said engine operation,
(d) a gas-exhaust means for selectively connecting said cylinder chamber to said gas-cooling means and for discharging hot combustion gas from said cylinder chamber into said gas-cooling means in timed relation to said engine operation,
(e) an oxygen-delivery means for adding oxygen to said combustion gas,
(f) a fuel delivery means for adding fuel to said combustion gas,
(g) a pressure-control means for controlling the pressure of said recycled combustion gas and for discharging excess combustion gas into outside atmosphere, and
(h) a control means for controlling the operation of said engine, said gas-cooling means and said pressure-control means in response to operator's demands and in accordance with a control program incorporated in said control means, said control program containing instructions for operating said engine in a gas-recycling mode by repeatedly performing an engine cycle that includes the steps of:
  (1) receiving said cooled combustion gas from said gas-cooling means into said cylinder chamber,
  (2) adding oxygen and fuel to said cooled combustion gas, whereby a combustible mixture forms,
  (3) using said combustible mixture to perform an internal-combustion cycle in said cylinder chamber, whereby said hot combustion gas forms,
  (4) transferring said hot combustion gas from said cylinder chamber into said gas-cooling means,
  (5) discharging excess combustion gas through said pressure-control means into outside atmosphere, and
  (6) cooling said hot combustion gas in said gas-cooling means, whereby said hot combustion gas turns into said cooled combustion gas,
whereby said engine operates without receiving air from outside atmosphere,
whereby said combustible mixture contains no nitrogen,
whereby no nitrogen oxides are produced in said engine, and
whereby harmful exhaust emissions are recycled back into said engine and burned there.

* * * * *